UNITED STATES PATENT OFFICE.

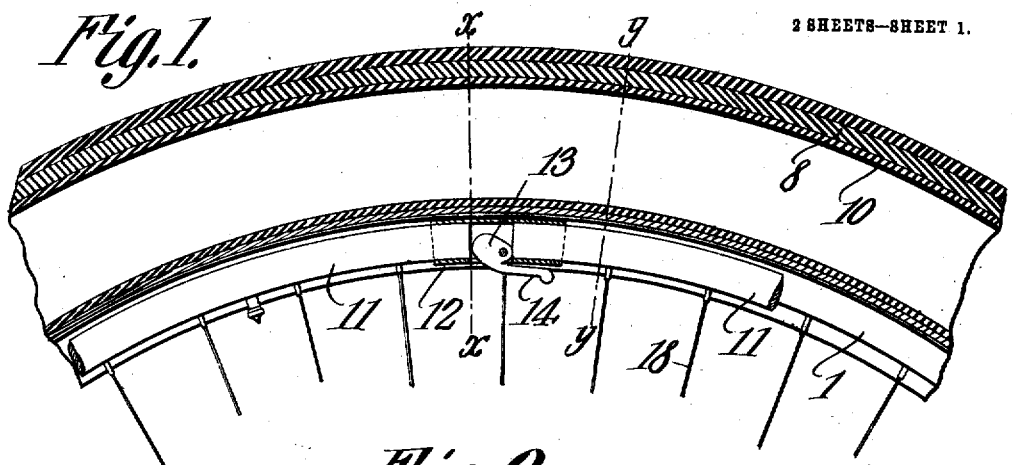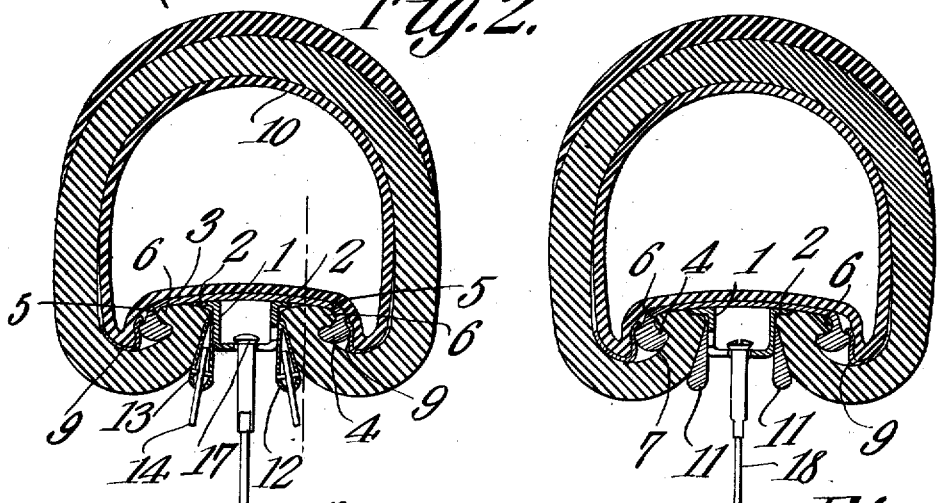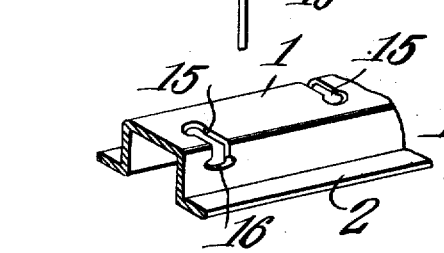

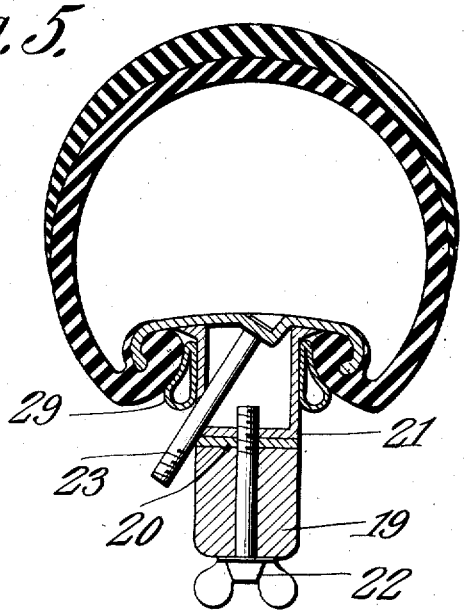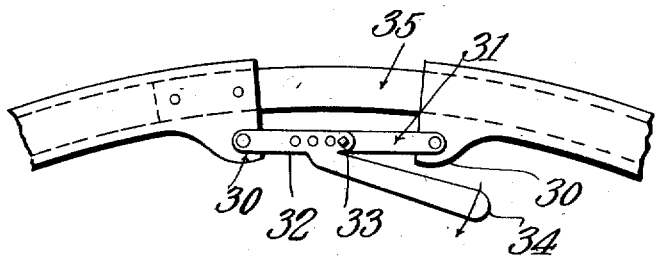

JOHN L. COESIR, OF JOPLIN, MISSOURI.

PNEUMATIC TIRE.

No. 904,409.

Specification of Letters Patent.

Patented Nov. 17, 1908.

Application filed January 30, 1908. Serial No. 413,481.

*To all whom it may concern:*

Be it known that I, JOHN L. COESIR, a citizen of the United States, residing at Joplin, in the county of Jasper and State of Missouri, have invented a new and useful Pneumatic Tire, of which the following is a specification.

This invention relates to pneumatic tires and more particularly to means for mounting the same upon a wheel whereby injury to the tire body as a result of its frictional engagement with the rim of the wheel is reduced to the minimum.

Another object is to provide novel means for fastening the tire to the wheel rim, said means being readily adjustable so as to secure or loosen the tire relatively to the rim.

A further object is to provide a wheel rim of novel form to which spokes may be quickly attached, the same being held against displacement by the tire retaining devices.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a section through a tire embodying the present improvements, one of the fastening means used therewith being shown partly in section and partly in elevation. Fig. 2 is a section on line *x—x*, Fig. 1. Fig. 3 is a section on line *y—y*, Fig. 1. Fig. 4 is a detail view of a portion of the felly of the wheel and showing the spoke receiving slots therein. Fig. 5 is a section through a modified form of tire embodying the present improvement. Fig. 6 is a detail view of a modified means for expanding the wedge bands.

Referring to the figures by characters of reference, 1 designates the felly of the wheel, the same being preferably in the form of a rim substantially U-shaped in section and having annular flanges 2 designed to bear against and to be brazed or otherwise secured to the inner or concaved face of the wheel rim 3. The edge portions of this rim are curved inwardly toward the felly 1 and are thickened to produce annular beads or clenchers 4. Those portions of these beads which lap the body portion of the rim 3 form annular grooves or channels 5 and these grooves are designed to receive the rounded heads 6 extending laterally from the inturned edge portions 7 of the outer tube 8 of the tire. This outer tube has fabric guard aprons 9 fastened upon the inner surface thereof and designed, when the heads 6 are seated between the clenchers 4 and the felly 1, to lap the clenchers so as to prevent the inner tube 10 from coming into contact with them.

In order that the heads 6 may be securely held in engagement with the clenchers wedge bands 11 are employed. Each of these bands is substantially circular in form and wedge-shaped in cross section and one band is insertible between the felly and each inturned portion of the outer tube 8, as indicated particularly in Figs. 2 and 3. Secured to one end of each band is a split tube 12 conforming in outline to the band and journaled within this tube is a cam 13 having a lever 14 extending beyond the tube and whereby the cam can be readily actuated. The cam is so shaped that when it is turned in one direction so as to bring the lever 14 against the band 11 said cam will operate to spread the ends of the band apart, thus increasing its diameter and causing it to wedge tightly between the felly and the edge portion of tube 8 so as to force the head 6 firmly into the groove or channel 5. Formed within the felly are slots 15 extending thereinto from opposite sides alternately, each slot being formed in one side portion of the felly and terminating in an eye 16 designed to receive the head 17 of a spoke 18. These eyes are so positioned that when the bands 11 are in place the eyes are closed thereby and the spokes thus prevented from becoming detached.

It is thought that the manner of assembling and detaching the parts of the tire will be fully understood from the foregoing description. Should it be desired to detach either one of the heads 6 from the rim 3 the band 11 coöperating with said head is loosened by swinging the arm 14 so as to permit the ends of the band to move toward each other. The band can then be drawn outward from engagement with the tube 8 and the inturned edge portion of said tube and its head 6 can be readily removed from engagement with the rim 2 and its clencher 4. By reversing this operation the tube 8 can be readily placed in position.

Importance is attached to the fact that the rim 3 and its clenchers 4 are located within the tire tube 8 and tend to pull inwardly thereon instead of pushing inwardly thereagainst as ordinarily. The strain upon the tire is thus materially reduced and inasmuch as all of those portions of the rim and clenchers which contact with the tire are rounded, wear upon the tire is reduced to the minimum. The guard apron 9 serves to prevent the inner tube from wearing upon the clenchers and the rim 3 presents a broad, smooth, unyielding surface to said tube.

The construction heretofore described relates solely to all-metal wheels. Where it is desired to fasten the tire to a wheel having a wooden felly a construction such as disclosed in Fig. 5 may be employed. By referring to this figure it will be seen that the wooden felly 19 is surrounded by a metal band 20 and upon this band rests the U-shaped metal felly 21 which is held upon the wooden felly 19 by means of screws 22 which are extended through the wooden felly 19 and have their threaded portions engaging the felly 21. As shown in this figure the valve tube 23 is preferably arranged diagonally within the felly 21 so as to extend to one side of wooden felly 19 without the necessity of notching or otherwise weakening said wooden felly.

In both of the forms heretofore described the wedge bands are utilized for the purpose of binding the edge portions of the tire upon the clenchers. The bands as heretofore described consist of solid metal strips but, as shown in Figs. 5 and 6 these bands may if desired be formed of flattened tubes as indicated at 29, said tubes being substantially circular and having ears 30 extending inwardly from their ends. Links 31 and 32 are pivotally connected to these ears and are adjustably connected together as indicated at 33 by means of a detachable bolt fitted within one of the series of openings. Link 32 is preferably formed with an arm 34 whereby the two links can be shifted so as to force apart the ends of the wedge band and increase the diameter thereof. A coupling tongue 35 is riveted or otherwise secured within one of the ends of the band and is designed to loosely project into the other end thereof as shown in Fig. 6. It will be apparent that by swinging the arm 34 in the direction of the arrow in Fig. 6 the links 31 and 32 will be folded and draw the ends of the wedge band toward each other, thus loosening the tire. By reversing the movement of the arm 34 the band will be expanded so as to tightly wedge between the felly and the edge portions of the tire so as to clamp said portion upon the adjoining clencher.

What is claimed is:

1. The combination with a wheel rim having inwardly extending annular clenchers, and a felly interposed between the clenchers; of a tube embracing the rim and clenchers, and having inturned edge portions insertible between the felly and the clenchers, an annularly exposed non-inflatable circular wedge interposed between the felly and each edge portion of the tube, for binding said portion in engagement with the adjoining clenchers and constantly exposed means upon said wedge for expanding the same to secure the edge portions of the tube upon the clenchers.

2. The combination with a wheel rim having inwardly extending annular clenchers and a felly interposed between the clenchers; of a tube having inturned edge portions insertible between the felly and the clenchers, tubular non-inflatable bands insertible between the felly and each edge portion of the tube, the end portions of said band telescoping, coöperating means at the ends of each band for expanding the band annularly, said means and the inner edge portion of the band being constantly exposed.

3. The combination with a wheel rim having inwardly extending annular clenchers and a felly interposed between the clenchers; of a tube having inturned edge portions insertible between the felly and the clenchers, said felly having spoke-receiving openings therein open at one side of the felly, noninflatable circular wedge shaped bands insertible between the felly and each edge portion of the tube, said bands constituting closures for the spoke-receiving openings, and coöperating means upon the end portions of each band for expanding the band annularly, said means and the inner portions of each band being exposed at all times.

4. The combination with a wheel-rim having inwardly extending annular clenchers and a felly interposed between the clenchers; of a tube embracing the rim and the clenchers, and having inturned edge portions insertible between the felly and clenchers, a non-inflatable circular wedge interposed between the felly and each edge portion of the tube, coöperating means upon the end portions of each wedge for expanding the wedge longitudinally to bind the edge portions of the tube in engagement with the adjoining clencher, said coöperating means and the inner edge portion of each wedge being exposed at all times.

5. A retaining ring for pneumatic tires comprising a tubular band wedge-shaped in cross sections, a telescopic connection between the end portions of the band, and coöperating means upon the end portions of the band for expanding the band annularly.

In testimony that I claim the foregoing as my own, I have hereto affixed my signature in the presence of two witnesses.

JOHN L. COESIR.

Witnesses:
B. F. ROBERTSON,
REMEA E. MASMER.